US011222611B2

(12) United States Patent
Sharma

(10) Patent No.: US 11,222,611 B2
(45) Date of Patent: Jan. 11, 2022

(54) IMAGE PROCESSING DEVICES, METHODS FOR CONTROLLING AN IMAGE PROCESSING DEVICE, AND COMPUTER-READABLE MEDIA

(71) Applicant: RAZER (ASIA-PACIFIC) PTE. LTD., Singapore (SG)

(72) Inventor: Ayush Sharma, Singapore (SG)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

(21) Appl. No.: 16/308,496

(22) PCT Filed: Jun. 14, 2016

(86) PCT No.: PCT/SG2016/050271
§ 371 (c)(1),
(2) Date: Dec. 10, 2018

(87) PCT Pub. No.: WO2017/217924
PCT Pub. Date: Dec. 21, 2017

(65) Prior Publication Data
US 2019/0272803 A1 Sep. 5, 2019

(51) Int. Cl.
*G09G 5/00* (2006.01)
*G09G 5/391* (2006.01)
(Continued)

(52) U.S. Cl.
CPC .......... *G09G 5/006* (2013.01); *G06F 3/1423* (2013.01); *G06T 3/0025* (2013.01); *G09G 5/391* (2013.01);
(Continued)

(58) Field of Classification Search
CPC ............ G09G 5/006; G09G 5/391; G09G 2340/0407; G09G 2370/12; H04N 7/104
See application file for complete search history.

(56) References Cited

U.S. PATENT DOCUMENTS 5,566,004 A * 10/1996 Imaizumi ............. H04N 1/3875
358/449
8,004,540 B1 * 8/2011 Munter ................. G06F 3/1438
345/2.2
(Continued)

FOREIGN PATENT DOCUMENTS

GB 2522468 A 7/2015
WO WO 2013/159028 A1 10/2013

OTHER PUBLICATIONS

Extended European Search Report dated Apr. 17, 2019, 10 pages, for the corresponding European Patent Application No. 16905619.9.
(Continued)

*Primary Examiner* — Jitesh Patel
(74) *Attorney, Agent, or Firm* — Polsinelli PC

(57) ABSTRACT

According to various embodiments, an image processing device may be provided. The image processing device may include: an input circuit configured to receive display data; a splitting circuit configured to split the display data into a first output and a second output; a first output circuit configured to output the first output for displaying with a first spatial resolution; and a second output circuit configured to output the second output for displaying with a second spatial resolution.

17 Claims, 3 Drawing Sheets

(51) Int. Cl.
*H04N 7/10* (2006.01)
*G06F 3/14* (2006.01)
*G06T 3/00* (2006.01)
*H04N 21/47* (2011.01)
*H04N 21/431* (2011.01)

(52) U.S. Cl.
CPC ......... *H04N 7/104* (2013.01); *H04N 21/4316* (2013.01); *H04N 21/47* (2013.01); *G09G 2300/026* (2013.01); *G09G 2320/0686* (2013.01); *G09G 2340/0407* (2013.01); *G09G 2370/12* (2013.01)

(56) References Cited

U.S. PATENT DOCUMENTS

| | | | |
|---|---|---|---|
| 8,269,902 B2 | 9/2012 | Plut | |
| 8,646,920 B2 | 2/2014 | Plut | |
| 8,669,997 B2 | 3/2014 | Kotani | |
| 9,007,432 B2 | 4/2015 | Chuang et al. | |
| 9,035,969 B2 | 5/2015 | Ivashin et al. | |
| 9,039,194 B2 | 5/2015 | Tannhäuser et al. | |
| 2006/0215765 A1 | 9/2006 | Hwang et al. | |
| 2009/0027425 A1* | 1/2009 | Park | G09G 3/3607 345/690 |
| 2010/0039561 A1 | 2/2010 | Kwisthout | |
| 2010/0201878 A1 | 8/2010 | Barenbrug et al. | |
| 2011/0128294 A1 | 6/2011 | Manabe et al. | |
| 2012/0050314 A1* | 3/2012 | Wang | G06F 3/1446 345/619 |
| 2012/0098930 A1* | 4/2012 | Yamaguchi | H04N 13/139 348/43 |
| 2012/0206343 A1 | 8/2012 | Plut | |
| 2012/0223885 A1 | 9/2012 | Perez | |
| 2013/0181901 A1 | 7/2013 | West | |
| 2013/0222386 A1 | 8/2013 | Tannhäuser et al. | |
| 2014/0051510 A1 | 2/2014 | Benko et al. | |
| 2014/0146080 A1 | 5/2014 | Ivashin et al. | |
| 2015/0077356 A1* | 3/2015 | Choi | G06F 3/1423 345/173 |
| 2015/0124170 A1* | 5/2015 | Kenmochi | H04N 5/44591 348/564 |
| 2015/0138222 A1 | 5/2015 | Imaizumi et al. | |
| 2015/0187333 A1* | 7/2015 | Loeffler | G06F 3/1438 345/1.3 |
| 2015/0229890 A1 | 8/2015 | Ohno | |
| 2015/0253974 A1 | 9/2015 | Young et al. | |
| 2015/0254802 A1* | 9/2015 | Sartor | G06T 3/40 345/660 |
| 2015/0348250 A1* | 12/2015 | Nakai | G09G 3/20 345/635 |
| 2017/0041580 A1* | 2/2017 | Ohira | H04N 9/3185 |
| 2017/0084155 A1* | 3/2017 | Mese | H04M 1/72519 |
| 2018/0286339 A1* | 10/2018 | Koudo | G09G 3/3648 |

OTHER PUBLICATIONS

International Search Report and Written Opinion, dated Mar. 14, 2017, for the corresponding International Application No. PCT/SG2016/050271 in 13 pages.

Patrick Baudisch, et al., "Focus Plus Context Screens: Combining Display Technology with Visualization Techniques", Information Sciences and Technologies Laboratory; retrievable at http://www.patrickbaudisch.com/publications/2001-Baudisch-UIST01-FocusPlusContextScreens.pdf in 10 pages.

"IllumiRoom: Peripheral Projected Illusions for Interactive Expereinces", Microsoft, established Jan. 4, 2013, retrievable via the internet at https://www.microsoft.com/en-us/research/project/illumiroom-peripheral-projected-illusions-for-interactive-experiences/.

Paul Bourke, "Low cost projection environment for immersive gaming", Journal of Multimedia, v 3, n 1, 48-53, May 2008 in 6 pages.

Yasuhiro Seya, et. al., "Effects of Peripheral Visual Information on Performance of Video Game with Hemi-Spherical Immersive Projection Screen", Breaking New Ground: Innovation in Games, Play, Practice and Theory—Proceedings of DiGRA 2009, 2009, Breaking New Ground: Innovation in Games, Play, Practice and Theory—Proceedings of DiGRA 2009; Conference: 4th Digital Games Research Association International Conference: Breaking New Ground: Innovation in Games, Play, Practice and Theory, DiGRA 2009, Sep. 1, 2009-Sep. 4, 2009 in 7 pages.

Charles Henden, et. al., "A Surround Display Warp-Mesh Utility to Enhance Player Engagement", Lecture Notes in Computer Science (including subseries Lecture Notes in Artificial Intelligence and Lecture Notes in Bioinformatics), v 5309 LNCS, p. 46-56, 2008, Entertainment Computing—ICEC 2008—7th International Conference, Proceedings; Conference: 7th International Conference on Entertainment Computing, ICEC 2008, Sep. 25, 2008-Sep. 27, 2008; Sponsor: International Federation for Information Processing; Carnegie Mellon University, Entertainment Technology Center; WMS Gaming in 12 pages.

* cited by examiner

IMAGE PROCESSING DEVICES, METHODS FOR CONTROLLING AN IMAGE PROCESSING DEVICE, AND COMPUTER-READABLE MEDIA

TECHNICAL FIELD

Various embodiments generally relate to image processing devices, methods for controlling an image processing device, and computer-readable media.

BACKGROUND

Graphical displays provide a main means of feedback for users of computer games. Thus, there may be a need for improvements in graphical displays.

SUMMARY OF THE INVENTION

According to various embodiments, an image processing device may be provided. The image processing device may include: an input circuit configured to receive display data; a splitting circuit configured to split the display data into a first output and a second output; a first output circuit configured to output the first output for displaying with a first spatial resolution; and a second output circuit configured to output the second output for displaying with a second spatial resolution.

According to various embodiments, a method for controlling an image processing device may be provided. The method may include: receiving display data; splitting the display data into a first output and a second output; outputting the first output for displaying with a first spatial resolution; and outputting the second output for displaying with a second spatial resolution.

According to various embodiments, a computer-readable medium may be provided. The computer-readable medium may include instructions which, when executed by a computer, make the computer perform a method for controlling an image processing device. The method may include: receiving display data; splitting the display data into a first output and a second output; outputting the first output for displaying with a first spatial resolution; and outputting the second output for displaying with a second spatial resolution.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1A:
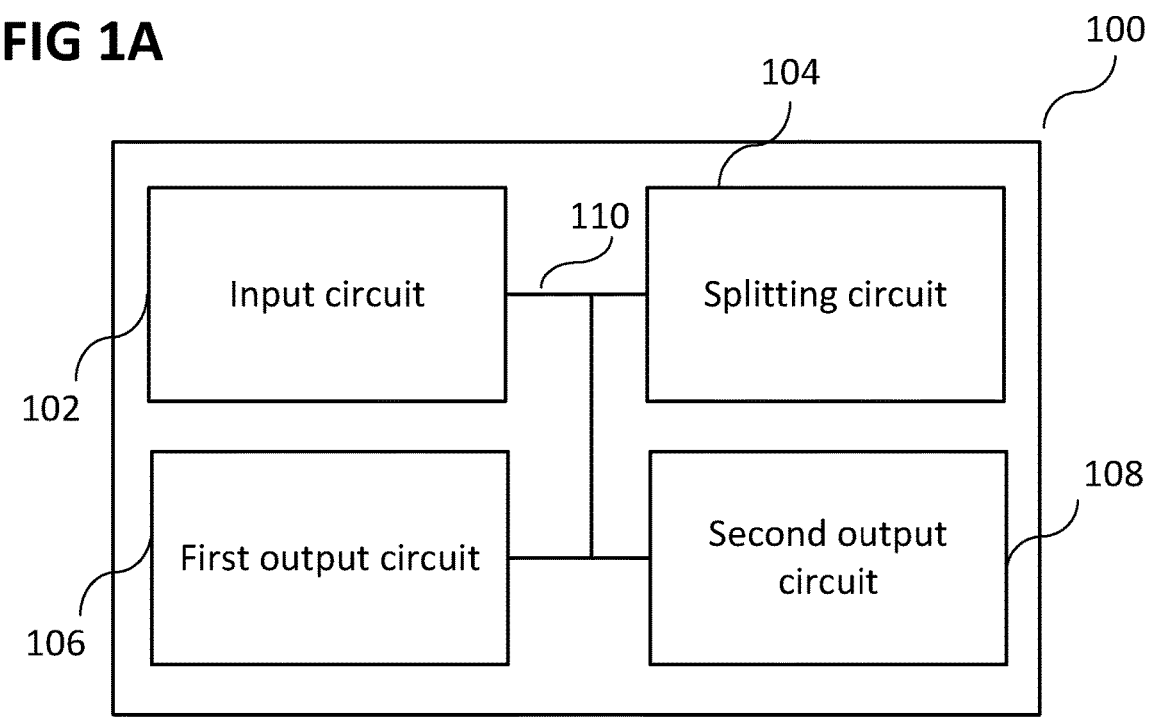
FIG. 1A shows an image processing device according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the image processing device as described in this description may include a memory which is for example used in the processing carried out in the image processing device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

According to various embodiments, an environmental projection system for computers may be provided. According to various embodiments a projector may project context display for a PC (personal computer) monitor.

According to various embodiments, an immersive experience from a projected context-display may be provided. This may be used in many applications, for example gaming, TV (television), social media related applications, or live-streaming.

FIG. 1A shows an image processing device 100 according to various embodiments. The image processing device 100 may include an input circuit 102 configured to receive display data. The image processing device 100 may further include a splitting circuit 104 configured to split the display data into a first output and a second output. The image processing device 100 may further include a first output circuit 106 configured to output the first output for displaying with a first spatial resolution. The image processing device 100 may further include a second output circuit 108 configured to output the second output for displaying with a second spatial resolution. The input 102, the splitting circuit 104, the first output circuit 106, and the second output circuit 108 may be coupled with each other, like indicated by lines 110, for example electrically coupled, for example using a line or a cable, and/or mechanically coupled.

In other words, an input may be split into a plurality of outputs for displaying with different spatial resolutions.

According to various embodiments, the input circuit 102 may include at least one input interface.

According to various embodiments, the input circuit 102 may include three input interfaces.

According to various embodiments, the display data may be stitched from data provided by the three input interfaces.

According to various embodiments, the input interface 102 may be configured according to at least one of High-Definition Multimedia Interface, display port, or Video Graphics Array.

According to various embodiments, the first output may include or may be a central area of the display data.

According to various embodiments, the second output may include or may be a circumferential area of the display data.

According to various embodiments, the first output circuit may include or may be an output interface.

According to various embodiments, the output interface may be configured according to at least one of High-Definition Multimedia Interface, display port, or Video Graphics Array.

According to various embodiments, the second output circuit 108 may include or may be a projector. In other words, the image processing device may be integrated in a projector. In other words, the image processing device may be a projector.

According to various embodiments, the second output circuit 108 may include or may be an output interface.

According to various embodiments, the output interface may be configured according to at least one of High-Definition Multimedia Interface, display port, or Video Graphics Array.

According to various embodiments, the first spatial resolution may be higher than the second spatial resolution.

According to various embodiments, the first spatial resolution may correspond to a spatial resolution of a display panel.

According to various embodiments, the first spatial resolution may correspond to a spatial resolution of about 20 to 500 pixels per inch.

According to various embodiments, the first spatial resolution may correspond to a spatial resolution of about 200 pixels per inch.

According to various embodiments, the first spatial resolution may correspond to a spatial resolution of a projector.

According to various embodiments, the first spatial resolution may correspond to a spatial resolution of less than 20 pixels per inch.

Figure 1B:
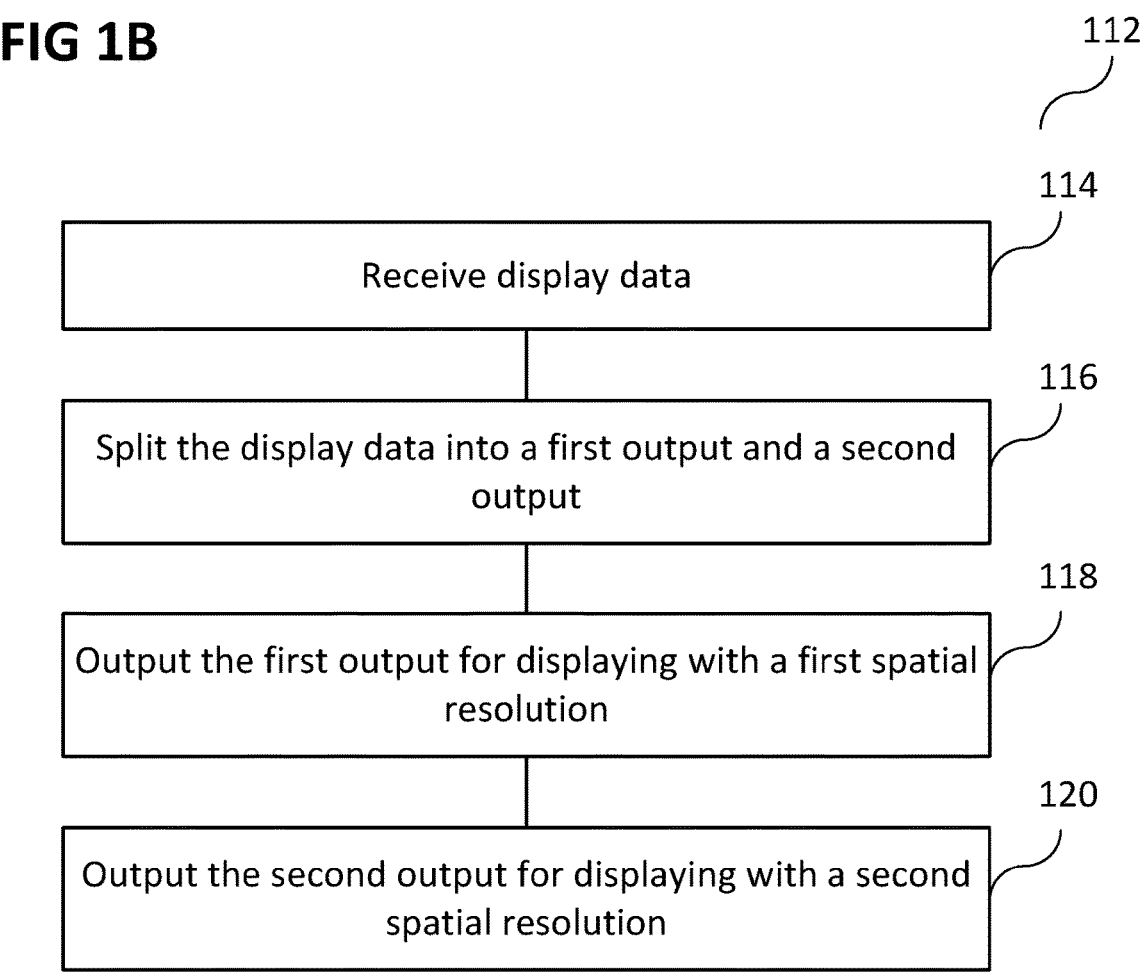
FIG. 1B shows a flow diagram illustrating a method for controlling an image processing device according to various embodiments.

FIG. 1B shows a flow diagram 112 illustrating a method for controlling an image processing device according to various embodiments. In 114, display data may be received. In 116, the display data may be split into a first output and a second output. In 118, the first output may be output for displaying with a first spatial resolution. In 120, the second output may be output for displaying with a second spatial resolution.

According to various embodiments, the method may further include stitching the display data from data provided by a plurality of input interfaces.

According to various embodiments, the first output may include or may be a central area of the display data.

According to various embodiments, the second output may include or may be a circumferential area of the display data.

According to various embodiments, the first spatial resolution may be higher than the second spatial resolution.

According to various embodiments, a computer-readable medium may be provided. The computer-readable medium may include instructions which, when executed by a computer, make the computer perform a method for controlling an image processing device. The method may include: receiving display data; splitting the display data into a first output and a second output; outputting the first output for displaying with a first spatial resolution; and outputting the second output for displaying with a second spatial resolution.

According to various embodiments, the computer-readable medium may further include instructions which, when executed by a computer, make the computer perform stitching the display data from data provided by a plurality of input interfaces.

According to various embodiments, the first output may include or may be a central area of the display data.

According to various embodiments, the second output may include or may be a circumferential area of the display data.

According to various embodiments, the first spatial resolution may be higher than the second spatial resolution.

In an application example of various embodiments, a PC (personal computer) may provide multi-monitor gaming (for example via nVidia surround/AMD Eyefinity or similar standards). One or more (for example at least 3) HDMI (High-Definition Multimedia Interface) or displayport outputs may be provided from the PC.

According to various embodiments, a projector device with one or more (for example 3, for example at least 3) video inputs and a plurality (for example 2) video outputs (for example one output to a primary screen e.g. TV (television) or PC Monitor via HDMI, and another output to the projector).

In a first step, the projector may accept 3 video inputs from a PC through HDMI/Displayport connections. The projector may then create a single video stream from them (using an internal hardware multiplexer).

Figure 2:
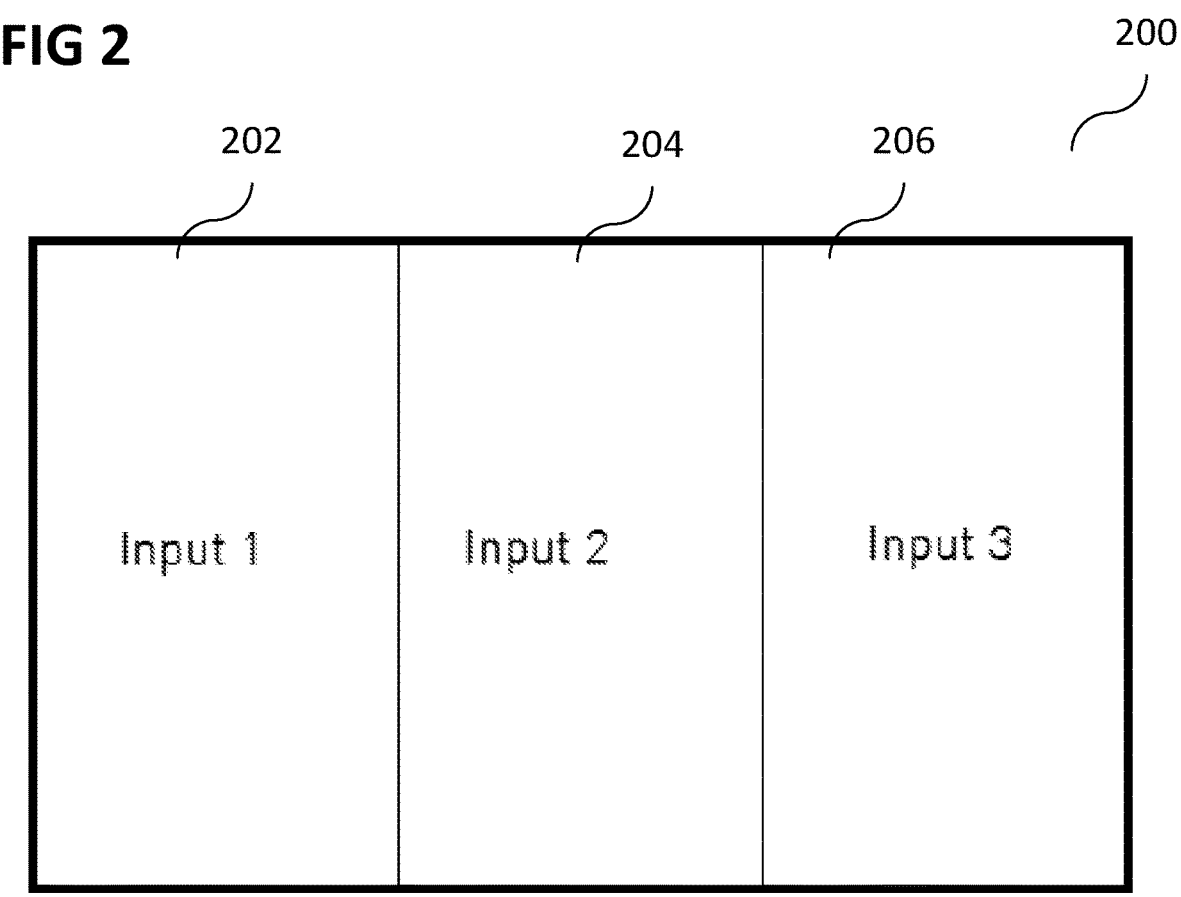
FIG. 2 shows an illustration of a plurality of inputs according to various embodiments.

FIG. 2 shows an illustration 200 of a plurality of inputs (for example a first input 202, a second input 204, and a third input 206) according to various embodiments, which together provide the information to be displayed. For example, each input of the plurality of inputs may provide pixel data for a pre-determined area of a total display area (for example, the first input 202 may provide information for a left portion of the display area, the second input 204 may provide information for a middle portion of the display area, and the third input 206 may provide information for a right portion of the display area).

Figure 3:
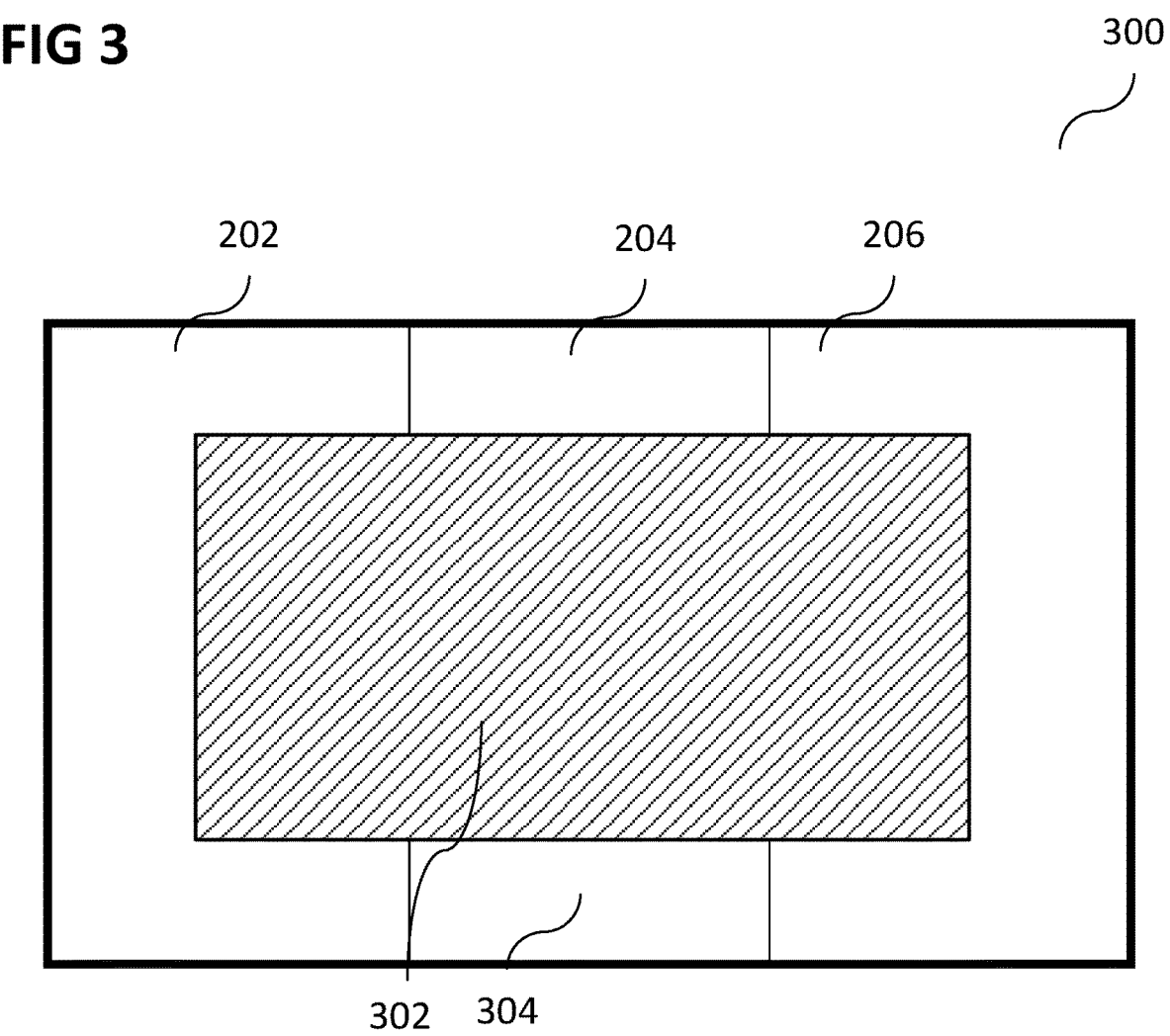
FIG. 3 shows an illustration of a plurality of outputs according to various embodiments.

In a second step 2, an internal hardware splitter (of the projector device) may split this video stream (provided by the three inputs 202, 204, 206) into two outputs, like illustrated in FIG. 3.

FIG. 3 shows an illustration 300 of a plurality of outputs according to various embodiments. A first output (for example the hatched area 302) may be displayed on a TV/monitor connected to the projector's downstream HDMI port. A second output (for example the non-hatched areas 304 of each of the first input 202, the second input 204, and the third input 206) may be projected around the periphery of the TV/Monitor. The hatched part 302 of the video stream may be not projected by the projector (for example, the internal splitter may delete it from the non-hatched video stream 304).

The non-hatched areas 304 of the video stream may be processed to suit either a flat projection surface or a curved/cuboidal projection area. This may be done in software (for example using software standards as described below), or done using hardware (for example using anamorphic lenses, or using algorithmic post-processing using hardware logic). Game developers may use a software standard in conjunction with external software APIs (application programming interfaces, like for example Nvidia's Simultaneous Multi Projection) for image transformation/pre-processing the output video, or the users may use software with is entirely independent from external software APIs.

According to various embodiments, to allow games to work flawlessly with the projector, a software standard may be provided for game developers to follow, which may allow games to work flawlessly with the projector. The software standard may include items like Field-of-View limits, HUD (head-up display) placement, and/or resolution recommendations.

According to various embodiments, a logic device (which may be integrated into the projector) may receive one or more (for example 3 or more) video streams from the PC using HDMI/DisplayPort interface. nVidia Surround/AMD Eyefinity or similar technology may be used to enable multiple output video streams.

The FOV (field of view), HUD/Overlay position and on-screen items of the video streams may be tuned based on guidelines by the game developer to ensure best experience.

According to various embodiments, the logic device may stitch the video streams to create a single, stitched video (multiplexing).

According to various embodiments, the logic device may cut out the focus portion and may output it to the primary display using an HDMI/DP connection.

According to various embodiments, the logic device may output the full frame minus the focus portion (replaced by a blank rectangle) to the projection output stream.

The whole process end-to-end may result in a small processing latency (~100 ms) as compared to direct output to an output device.

According to various embodiments, a logic device may be provided inside a projector device. The logic device may combine multiple video streams from the source (PC) and split the video streams into focus and context. The output port on the projector may then connect to the primary display and the context may be projected around the primary display using the projector itself.

According to various embodiments, a projector device may be provided that may be used operably with a computing device (for example portable or desktop or mobile portable devices). The projector may be operably connected with the display monitor (TV/computer monitor), and the CPU of the computing device.

It will be understood that although various embodiments have been described with respect to a projector, the image processing device (in other words: logic device) would not necessarily be integrated in a projector; instead, an interface to a projector may be provided.

The following examples pertain to further embodiments.

Example 1 is an image processing device comprising: an input circuit configured to receive display data; a splitting circuit configured to split the display data into a first output and a second output; a first output circuit configured to output the first output for displaying with a first spatial resolution; and a second output circuit configured to output the second output for displaying with a second spatial resolution.

In example 2, the subject-matter of example 1 can optionally include that the input circuit comprises at least one input interface.

In example 3, the subject-matter of example 2 can optionally include that the input circuit comprises three input interfaces.

In example 4, the subject-matter of example 3 can optionally include that the display data is stitched from data provided by three input interfaces.

In example 5, the subject-matter of any one of examples 2 to 4 can optionally include that the input interface is configured according to at least one of High-Definition Multimedia Interface, display port, or Video Graphics Array.

In example 6, the subject-matter of any one of examples 1 to 5 can optionally include that the first output comprises a central area of the display data.

In example 7, the subject-matter of any one of examples 1 to 6 can optionally include that the second output comprises a circumferential area of the display data.

In example 8, the subject-matter of any one of examples 1 to 7 can optionally include that the first output circuit comprises an output interface.

In example 9, the subject-matter of example 8 can optionally include that the output interface is configured according to at least one of High-Definition Multimedia Interface, display port, or Video Graphics Array.

In example 10, the subject-matter of any one of examples 1 to 9 can optionally include that the second output circuit comprises a projector.

In example 11, the subject-matter of any one of examples 1 to 10 can optionally include that the second output circuit comprises an output interface.

In example 12, the subject-matter of example 11 can optionally include that the output interface is configured according to at least one of High-Definition Multimedia Interface, display port, or Video Graphics Array.

In example 13, the subject-matter of any one of examples 1 to 12 can optionally include that the first spatial resolution is higher than the second spatial resolution.

In example 14, the subject-matter of any one of examples 1 to 13 can optionally include that the first spatial resolution corresponds to a spatial resolution of a display panel.

In example 15, the subject-matter of any one of examples 1 to 14 can optionally include that the first spatial resolution corresponds to a spatial resolution of about 20 to 500 pixels per inch.

In example 16, the subject-matter of any one of examples 1 to 15 can optionally include that the first spatial resolution corresponds to a spatial resolution of about 200 pixels per inch.

In example 17, the subject-matter of any one of examples 1 to 16 can optionally include that the first spatial resolution corresponds to a spatial resolution of a projector.

In example 18, the subject-matter of any one of examples 1 to 17 can optionally include that the first spatial resolution corresponds to a spatial resolution of less than 20 pixels per inch.

Example 19 is a method for controlling an image processing device, the method comprising: receiving display data; splitting the display data into a first output and a second output; outputting the first output for displaying with a first spatial resolution; and outputting the second output for displaying with a second spatial resolution.

In example 20, the subject-matter of example 19 can optionally include stitching the display data from data provided by a plurality of input interfaces.

In example 21, the subject-matter of any one of examples 19 to 20 can optionally include that the first output comprises a central area of the display data.

In example 22, the subject-matter of any one of examples 19 to 21 can optionally include that the second output comprises a circumferential area of the display data.

In example 23, the subject-matter of any one of examples 19 to 22 can optionally include that the first spatial resolution is higher than the second spatial resolution.

Example 24 is a computer-readable medium comprising instructions which, when executed by a computer, make the computer perform a method for controlling an image processing device, the method comprising: receiving display data; splitting the display data into a first output and a second output; outputting the first output for displaying with a first spatial resolution; and outputting the second output for displaying with a second spatial resolution.

In example 25, the subject-matter of example 24 can optionally include instructions which, when executed by a computer, make the computer perform: stitching the display data from data provided by a plurality of input interfaces.

In example 26, the subject-matter of any one of examples 24 to 25 can optionally include that the first output comprises a central area of the display data.

In example 27, the subject-matter of any one of examples 24 to 26 can optionally include that the second output comprises a circumferential area of the display data.

In example 28, the subject-matter of any one of examples 24 to 27 can optionally include that the first spatial resolution is higher than the second spatial resolution.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An image processing device comprising:
a plurality of input interfaces, each input interface of the plurality of input interfaces configured to provide pixel data for a predetermined area of a total display area;
a multiplexer configured to stitch the pixel data for the predetermined areas provided by each input interface into a display data, wherein the display data comprises a single stitched video;
an input circuit configured to receive the display data, wherein the display data is split into a plurality of outputs for display with different spatial resolutions;
a splitting circuit configured to split the display data into a first output and a second output, wherein the first output comprises a central area of the display data and the second output comprises a circumferential area of the display data;
wherein the plurality of outputs comprises:
a first output circuit configured to output the first output for displaying with a first spatial resolution, wherein the first output is connected to a downstream HDMI port; and
a second output circuit configured to output the second output for displaying with a second spatial resolution.

2. The image processing device of claim 1,
wherein the plurality of input interfaces comprises a first, a second and a third input interfaces; and
wherein the predetermined areas for each of the first, second and third input interfaces comprises, respectively, a left portion, a middle portion and a left portion of the total display area.

3. The image processing device of claim 1,
wherein each input interface is configured according to at least one of High-Definition Multimedia Interface, display port, or Video Graphics Array.

4. The image processing device of claim 1,
wherein at least one of the first output circuit and the second output circuit comprises an output interface.

5. The image processing device of claim 4,
wherein the output interface is configured according to at least one of High-Definition Multimedia Interface, display port, or Video Graphics Array.

6. The image processing device of claim 1,
wherein the second output circuit comprises a projector.

7. The image processing device of claim 1,
wherein the first spatial resolution is higher than the second spatial resolution.

8. The image processing device of claim 1,
wherein the first spatial resolution corresponds to a spatial resolution of at least one of a display panel and a projector.

9. The image processing device of claim 1,
wherein the first spatial resolution corresponds to a spatial resolution of between 0.787 pixels per millimeter to 19.685 pixels per millimeter, or a spatial resolution of less than 0.787 pixels per millimeter.

10. The image processing device of claim 1,
wherein the first spatial resolution corresponds to a spatial resolution of 7.87 pixels per millimeter.

11. The image processing device of claim 1, wherein the second output further comprises the central area of the display data being removed to form the circumferential area.

12. A method for controlling an image processing device, the method comprising:
- stitching pixel data for predetermined areas provided by inputs to form a single stitched video for splitting into a plurality of outputs of display data with different spatial resolutions using a plurality of input interfaces, wherein each input interface of the plurality of input interfaces provide pixel data for the predetermined area of a total display area;
- receiving the display data;
- wherein the plurality of outputs comprises:
- splitting the display data into a first output and a second output, wherein the first output comprises a central area of the display data and the second output comprises a circumferential area of the display data;
- outputting the first output for displaying with a first spatial resolution, wherein the first output is connected to a downstream HDMI port; and
- outputting the second output for displaying with a second spatial resolution.

13. The method of claim 12,
wherein the first spatial resolution is higher than the second spatial resolution.

14. The method of claim 12, wherein the second output further comprises the central area of the display data being removed to form the circumferential area.

15. A non-transitory computer-readable medium comprising instructions which, when executed by a computer, make the computer perform a method for controlling an image processing device, the method comprising:
- stitching pixel data for predetermined areas provided by inputs to form a single stitched video for splitting into a plurality of outputs of display data with different spatial resolutions using a plurality of input interfaces, wherein each input interface of the plurality of input interfaces provide pixel data for the predetermined area of a total display area;
- receiving the display data;
- wherein the plurality of outputs comprises:
- splitting the display data into a first output and a second output, wherein the first output comprises a central area of the display data and the second output comprises a circumferential area of the display data;
- outputting the first output for displaying with a first spatial resolution, wherein the first output is connected to a downstream HDMI port; and
- outputting the second output for displaying with a second spatial resolution.

16. The non-transitory computer-readable medium of claim 15,
wherein the first spatial resolution is higher than the second spatial resolution.

17. The non-transitory computer-readable medium image processing device of claim 15, wherein the second output further comprises the central area of the display data being removed to form the circumferential area.

* * * * *